(12) United States Patent
Stoney

(10) Patent No.: US 6,954,803 B2
(45) Date of Patent: Oct. 11, 2005

(54) HIGHLY PIPELINED PRINTING SYSTEM ARCHITECTURE

(75) Inventor: Graham Stoney, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 638 days.

(21) Appl. No.: 09/863,434

(22) Filed: May 24, 2001

(65) Prior Publication Data

US 2002/0004859 A1 Jan. 10, 2002

(30) Foreign Application Priority Data

May 24, 2000 (AU) .......................................... PQ 7723

(51) Int. Cl.⁷ .............................................. G06F 3/12
(52) U.S. Cl. .......................... 710/7; 358/1.1; 358/1.12; 358/1.14; 358/1.15; 358/1.16; 358/2.1; 399/1; 399/366; 382/100; 379/100.15
(58) Field of Search .............................. 710/7; 358/1.1, 358/1.12, 1.14, 1.15, 1.16, 2.1; 399/1, 366; 382/100; 379/100.15

(56) References Cited

U.S. PATENT DOCUMENTS

| | | | |
|---|---|---|---|
| 5,787,308 A | 7/1998 | Suzuki et al. | ............... 395/839 |
| 5,835,122 A | 11/1998 | Oki et al. | ................... 347/251 |
| 6,128,095 A | 10/2000 | Murata | ...................... 358/1.16 |
| 6,177,934 B1 * | 1/2001 | Sugiura et al. | ............. 345/748 |
| 6,515,755 B1 * | 2/2003 | Hasegawa | ................... 358/1.14 |
| 6,545,766 B1 * | 4/2003 | Shima et al. | .............. 358/1.14 |
| 6,552,816 B1 * | 4/2003 | Shima | ....................... 358/1.15 |
| 6,594,031 B1 * | 7/2003 | Taima | ....................... 358/1.15 |
| 6,600,569 B1 * | 7/2003 | Osada et al. | ............... 358/1.12 |
| 6,621,588 B1 * | 9/2003 | Shimada | .................... 358/1.15 |
| 6,621,918 B1 * | 9/2003 | Hu et al. | ..................... 382/128 |
| 6,687,022 B1 * | 2/2004 | Lapstun et al. | ............. 358/1.9 |
| 6,707,566 B1 * | 3/2004 | Endoh | ....................... 358/1.15 |

FOREIGN PATENT DOCUMENTS

| | | |
|---|---|---|
| EP | 0 886 205 | 12/1998 |
| EP | 0 886 236 | 12/1998 |
| EP | 0 950 980 | 10/1999 |
| JP | 409006561 A * | 1/1997 |

OTHER PUBLICATIONS

IBM Technical Disclosure Bulletin, "Printer using direct memory access to reduce communication bandwidth", vol. 33, No. 8., Jan. 8, 1991, pp. 485–486.

* cited by examiner

Primary Examiner—A. Elamin
(74) Attorney, Agent, or Firm—Fitzpatrick, Cella, Harper & Scinto

(57) ABSTRACT

A printing system is disclosed, the system including a receiving hardware interface (300) for coupling page description data to an interpreter (304) said interpreter interpreting the page description data to thereby output a display list to a renderer software interface (308) which processes the display list to thereby output a processed display list, and rendering hardware (312) for processing the processed display list to thereby output raw pixel data, wherein the receiving hardware interface (300), the interpreter (304), the rendering software interface (308), and the rendering hardware (312) are arranged to operate in a pipelined manner, being thereby capable of concurrently processing job data from at least one page of the print job.

17 Claims, 7 Drawing Sheets

HIGHLY PIPELINED PRINTING SYSTEM ARCHITECTURE

TECHNICAL FIELD OF THE INVENTION

The present invention relates generally to printing systems, and in particular, to high performance print systems. The present invention relates to a method and apparatus for pipeline data processing in printer systems.

BACKGROUND ART

Conventional desktop and mainframe computer-based printing systems typically operate by processing pages in a document in a sequential manner. Accordingly, each page is individually processed, the individual processing for a particular page having to be completed before processing for a following page commences. As a consequence, the processing for a page does not begin until the previous page has been completely printed. The printing process itself typically consists of a number of sequential processing stages, each of which is made up of a combination of computer software and hardware based sub-processes. In the conventional printing model, each sub-process stage must be fully completed before the next sub-process stage can commence.

Many modern printer engines are capable of printing multiple pages during a single printing cycle. These engines must, however, be fed data continuously, in order to maintain the continuous printing cycle, and thus perform at their maximum rated engine speed and throughput. If a situation arises where raw data required for printing a particular page is not ready when required, the printer engine must cycle down to a standby mode in an orderly fashion, and cease feeding input media, such as paper, in order to prevent blank media appearing in the middle of the output document. Only when raw data is again available for the subsequent page, can the printer engine again begin processing.

This cycle down/cycle up process reduces engine throughput considerably, and of course, causes the printing system to operate below maximum performance levels. The presence of bottlenecks which are inherent in conventional sequential printing systems makes it difficult to provide a continuous supply of raw print data to the printer engine as required. As printer engine speeds increase, this problem is exacerbated, since the speed with which the raw data must be supplied to the print engine also increases. Furthermore, as achievable print resolution increases, the volume of data processed in the course of each print job also increases, typically increasing in proportion to the square of the resolution increase, since the printed page is two-dimensional. The aforementioned technological advances place increasing strain on the conventional sequential processing model.

One present solution to the aforementioned problems is to "spool" job data at various stages in the print data flow processing. This approach can sometimes eliminate the cycle down/cycle up problem if applied to a relatively short print run. A penalty is incurred, however, since spooling adds additional overhead to the print data processing, because data must be typically copied to, and from, a relatively slow storage device such as a hard disc. Furthermore, spooling introduces an arbitrary restriction on the length of a print job, since data for an entire job must typically be stored in spooling systems. Furthermore, the spooling approach also introduces additional start-up delay, before the first page of a job can be printed.

SUMMARY OF THE INVENTION

It is an object of the present invention to substantially overcome, or at least ameliorate, one or more disadvantages of existing arrangements.

According to a first aspect of the invention, there is provided a printing system for printing a print job comprising a number of pages, the system including:

a receiving hardware interface for performing first coupling of incoming page description data, in the form of a display list, to a renderer software interface;

said renderer software interface for performing first processing of the display list to thereby output a first processed display list; and rendering hardware, adapted to perform second processing of the first processed display list to thereby output raw pixel data, wherein:

said receiving hardware interface, the rendering software interface, and the renderer hardware are arranged to operate in a pipelined manner, being thereby capable of concurrently processing job data from at least one page of the print job.

According to another aspect of the invention, there is provided a method of data processing for a printing system adapted for printing a print job comprising a number of pages, said method comprising steps of:

first coupling, by a receiving hardware interface, of incoming page description data to a renderer software interface in the form of a display list;

performing first processing, by the renderer software interface, of the display list to thereby output a first processed display list; and performing second processing, by rendering hardware, of the first processed display list to thereby output raw pixel data, wherein:

said first coupling, said first and said second processing steps operate in a pipelined manner, being thereby capable of concurrently processing job data from at least one page of the print job.

According to another aspect of the invention, there is provided a computer readable medium for storing a program for a print system adapted to print a job comprising a number of pages, said program comprising:

code for a first coupling step for coupling, by a receiving hardware interface, of incoming page description data to a renderer software interface in the form of a display list;

code for a first processing step for processing, by the renderer software interface, of the display list to thereby output a first processed display list; and code for a second processing step for processing, by rendering hardware, of the first processed display list to thereby output raw pixel data, wherein:

said code for the first coupling step, said code for the first and said second processing steps operate in a pipelined manner, being thereby capable of concurrently processing job data from at least one page of the print job.

According to another aspect of the invention, there is provided a computer program for a print system adapted to print a job comprising a number of pages, said program comprising:

code for a first coupling step for coupling, by a receiving hardware interface, of incoming page description data to a renderer software interface in the form of a display list;

code for a first processing step for processing, by the renderer software interface, of the display list to thereby output a first processed display list; and code for a second processing step for processing, by rendering hardware, of the first processed display list to thereby output raw pixel data, wherein:

said code for the first coupling step, said code for the first and said second processing steps operate in a pipelined manner, being thereby capable of concurrently processing job data from at least one page of the print job.

According to another aspect of the invention, there is provided a method of data processing for a printing system which comprises a sequence of pipeline processes, said method comprising, for a current pipeline process, steps of;

reading input data from an upstream pipeline process;

operating upon said input data if an internal buffer of said current pipeline process is not full;

stalling said upstream pipeline process, if said internal buffer is full; and writing said input data, having operated thereupon, to a downstream pipeline process, if said downstream pipeline process is not stalling said current pipeline process.

BRIEF DESCRIPTION OF THE DRAWINGS

One or more embodiments of the present invention will now be described with reference to the drawings, in which.

DETAILED DESCRIPTION INCLUDING BEST MODE

Figure 1:
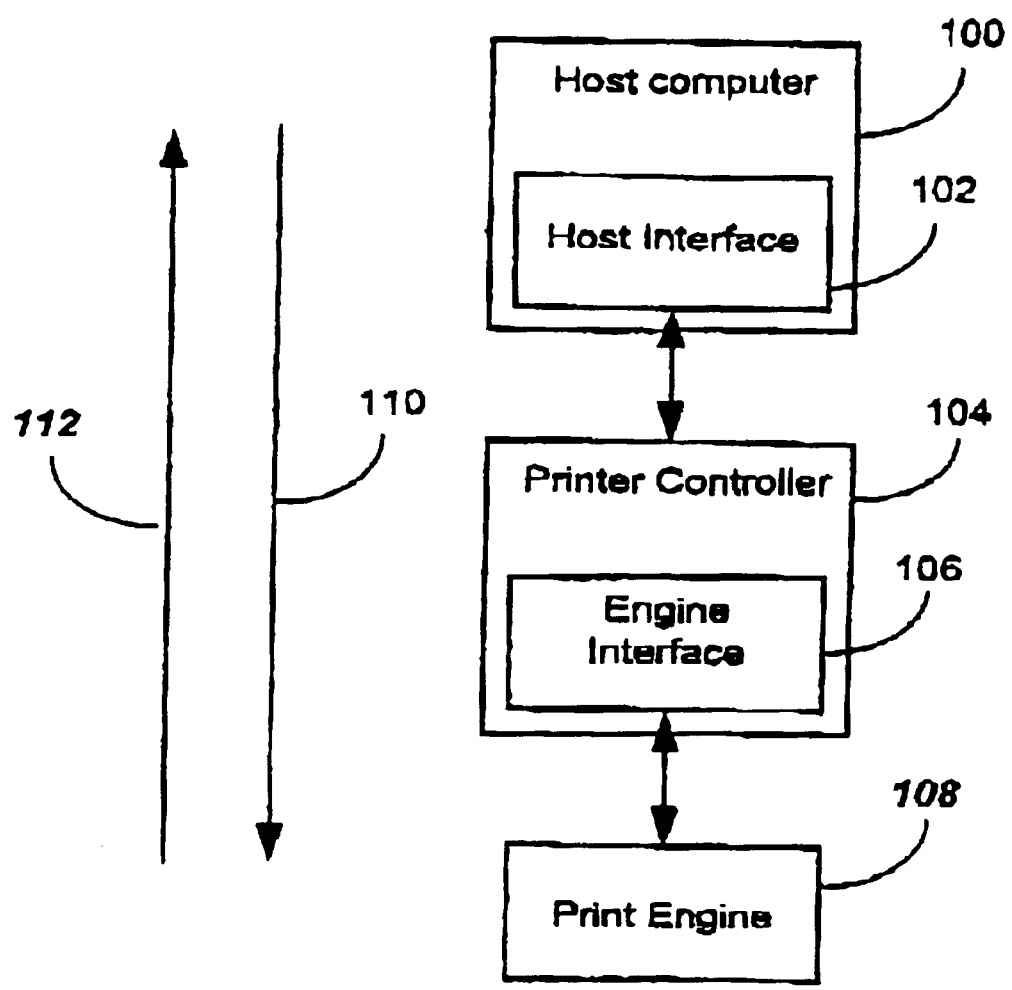
FIG. 1 shows a block diagram representation of hardware components in a printing system according to a first arrangement.

Where reference is made in any one or more of the accompanying drawings to steps and/or features, which have the same reference numerals, those steps and/or features have for the purposes of this description, the same function(s) or operation(s), unless the contrary intention appears.

In the context of this specification, the term "line" is used to denote a data connection between process blocks, and/or between sub-process blocks. Data connections can take a variety of different, but functionally equivalent physical forms, including hard-wired and wired connections, and can also represent software calls between software processes.

Figure 2:
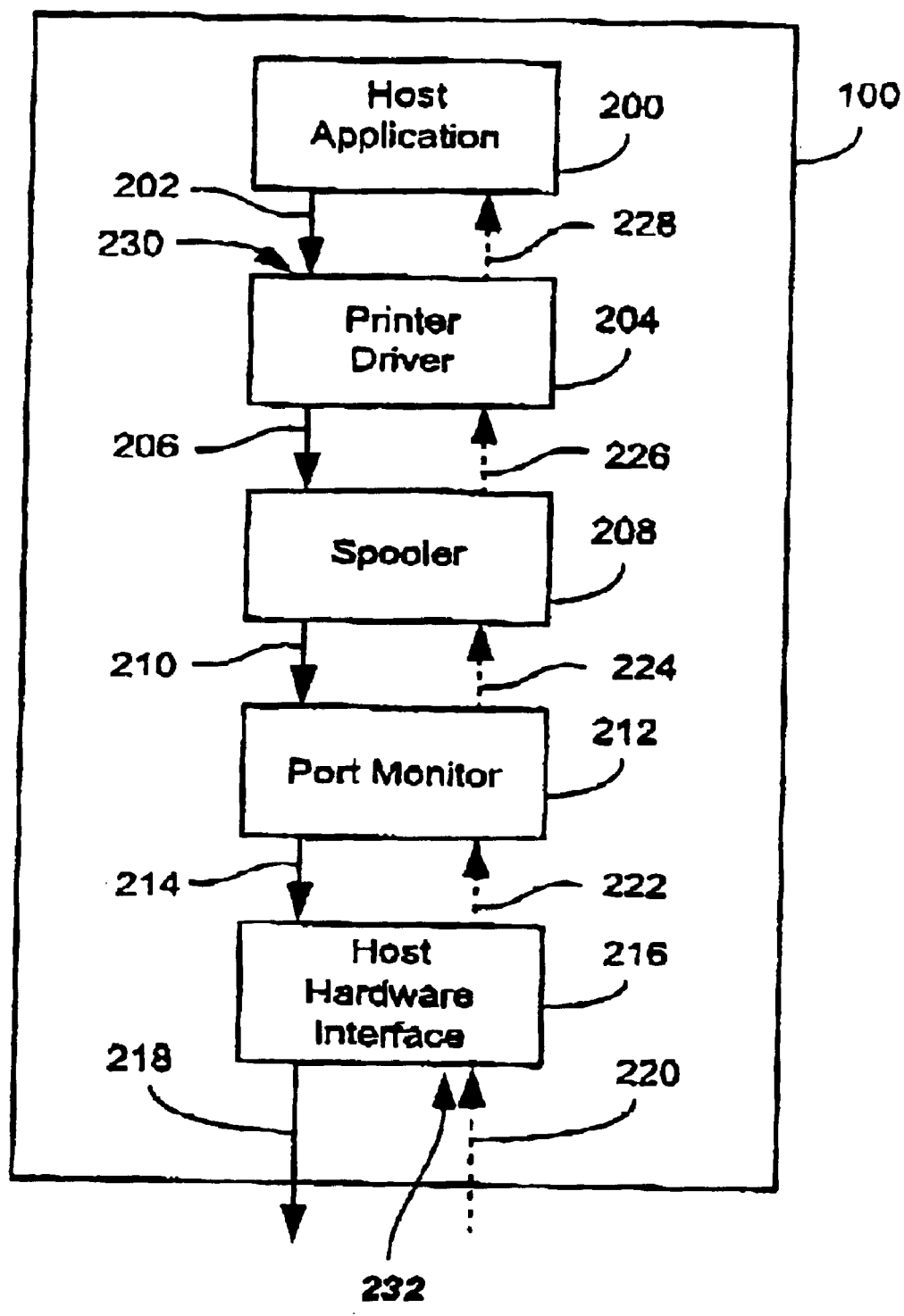
FIG. 2 shows a pipeline arrangement for the host computer of FIG. 1.
Figure 3:
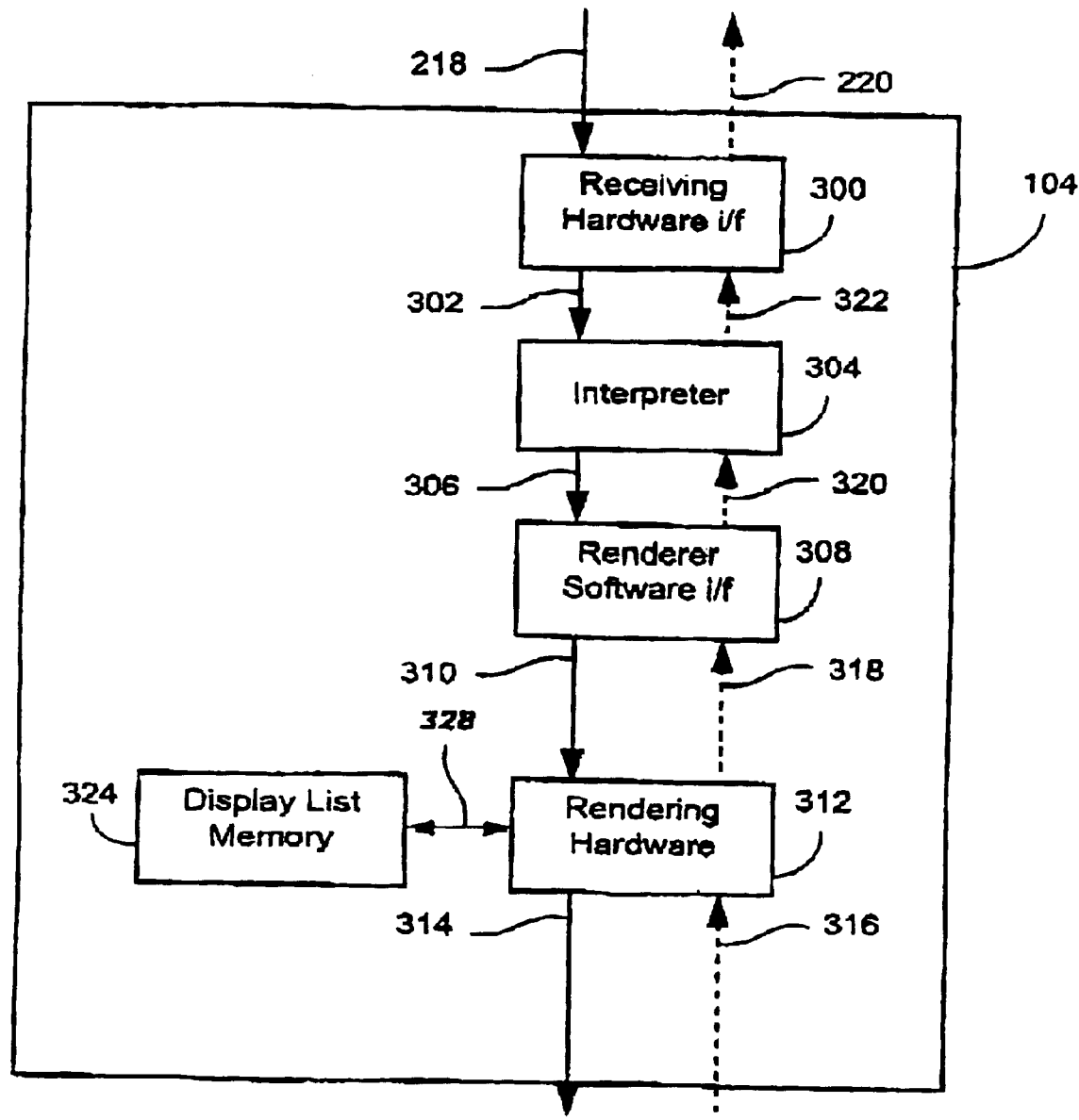
FIG. 3 shows pipeline processing details for the printer controller of FIG. 1.
Figure 4:
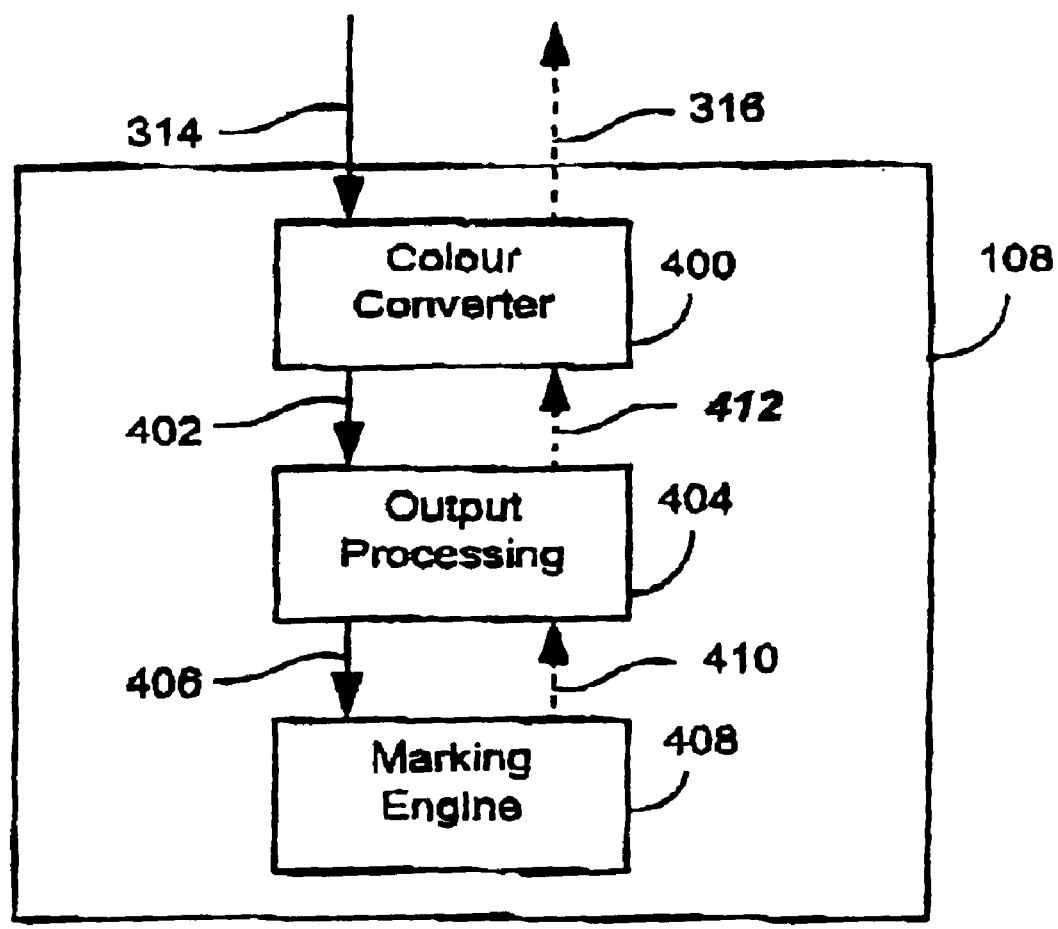
FIG. 4 shows pipeline details for the print engine of FIG. 1.

FIG. 1 shows major hardware components of a printing system, according to a first arrangement. The system supports both a forward data flow depicted by an arrow 110, and a reverse data flow depicted by an arrow 112. A host computer 100 incorporates a host interface 102, which provides an operative coupling between the host computer 100 and a printer controller 104. The printer controller 104, in turn, incorporates an engine interface 106 which provides an operative coupling to a print engine 108. The print engine 108 is operable for the feeding of output media, and marking print data thereon, to thus perform a printing function, the output media typically being paper. Typically, the printer controller 104 and the print engine 108 are regarded as a single entity by an end user, however such can often be sourced from different Orignal Equipment Manufacturers (OEMs). FIGS. 2–4 will first be described in terms of processes acting on the forward data path 110, and thereafter the reverse data path 112 will be described. The various components shown in FIG. 1 may be performed by a combination of hardware and software, the extent of combination typically being dependent upon the desired functions of the specific component. Typically, a physical combination of the printer controller 104 and the print engine 108 is called a "printer".

FIG. 2 illustrates pipeline processes operating within the host computer 100 as described in the above arrangement, and in particular, relates to processes on the forward data path 110. FIG. 2 elaborates on the various data processing stages within major hardware and software components depicted in FIG. 1. The processing stages depicted in FIG. 2 are configured to operate sequentially but concurrently, in which a current stage can accept data from a previous stage, and send data to a downstream stage as output data from the current stage becomes available. Each stage also provides a "stall control" signal back to the previous (upstream) stage, in order to indicate when data flow should be quenched to avoid causing overflow of internal buffers in the downstream stage or stages of the pipeline.

Accordingly, having regard to a page to be printed, a host application 200 makes printer Graphical Device Interface (GDI) calls on a line 202, these calls describing the page image to a printer driver 204. GDI calls are used in Windows™ operating systems manufactured by Microsoft Corporation of USA. The host application 200 uses a GDI call to tell the printer driver 204 about the appearance of the page to be printed. GDI calls can, for example, direct the printer driver 204 to draw a circle, line, picture or other graphical object at a specific location on the output page. The printer driver 204 in turn generates a page description for communication on a line 206, this description being produced in any applicable Page Description Language (PDL) accepted by the printer. Typical page description languages include Postscript, PCL, LIPS, or alternatively, printer specific formats which can be proprietary. The page description generated by the printer driver 204 is written to a spooler 208, which may be part of a Windows™ printing system manufactured by Microsoft Corp USA. The spooler 208 in the present arrangement sends the data, using a line 210, directly to a printer port monitor 212, without a need to spool the data onto a disk drive memory of the computer 100. The port monitor 212 in turn sends the data, using a line 214, to an applicable host hardware interface 216, performing the functions of the interface 102, and which can be any interface capable of communications with the printer. Examples of such interfaces include IEEE-1284, TCP/IP over Ethernet, or any other suitable printer interface. Job data from the hardware interface 216 is sent on a line 218 to a printer controller receiving hardware interface 300 (see FIG. 3).

FIG. 3 shows pipeline processing details for the printer controller 104 of FIG. 1 A receiving hardware interface 300 receives job data on the line 218 and sends the job data on a line 302 to a page description language interpreter 304, which interprets the contents of the job data on arrival, in order to generate and send a display list. In one arrangement, the interpreter 304 generates a display list whose content is substantially identical to the job data received on the line 302, with merely the header and other overhead information removed. In another arrangement, the interpreter 304 interprets the job data on the line 302 to produce a display list which is substantially different to the received PDL job data. The display list is transferred using a line 306 to a renderer software interface 308. The display list which is received by the renderer software interface 308 on the line 306 is processed into a form suitable for rendering and sent, on a line 310, to a rendering hardware process 312. The renderer software interface 308 can take a number of different forms depending upon the arrangement of the description language interpreter 304. If the interpreter 304 performs, as described, a header-stripping operation only, then the renderer software interface 308 merely controls the rendering hardware process 312, performing little, if any additional processing. If on the other hand, the interpreter 304 performs a more comprehensive interpretation function, then the renderer software interface 308 performs a correspondingly more complex processing to bring the display list into a form suitable for rendering. The rendering hardware process 312 stores and retrieves the data received on the line 310 in a display list memory 324. The storage and retrieval in the display list memory 324, which is depicted by a bilateral arrow 328, is performed using, possibly, Direct Memory Access (DMA), and the rendering hardware processes 312 generates raw pixel data for transmission from the printer controller 104 using a line 314. The raw pixel data which is sent on the line 314 can be represented, for example, in the RGB colour space, and is sent to a colour converter 400 of the print engine 108, as seen in FIG. 4.

FIG. 4 shows pipeline process details for the print engine 108. The incoming raw pixel data which is received on the line 314 is input into a colour converter 400, which converts the data to a colour space as required by a subsequent marking process 408, such as CMYK. The colour converter 400 outputs the CMYK (or alternative) pixel data on a line 402 to an output processing sub-process 404, which generates host processed marker data for sending on a line 406 as required by the marking engine 408. The marking engine 408 generates a final image on the appropriate output medium.

The above description has been directed to the forward data flow path 110 shown in FIG. 1 from the host application 200 and through to the marking engine 408. It is noted that each stage in the aforementioned cascade of sub-processes typically has some internal buffering. Each stage can, in addition, signal a "stall condition" back to an upstream stage in the pipeline, should the corresponding internal buffer become full. This signalling takes place in the direction of the reverse data flow path 112 shown in FIG. 1 and makes use of the lines 220–228 of FIG. 2, lines 316–322 of FIG. 3 and lines 410 and 412 of FIG. 4.

It is noted that the afore-described processing stages can be implemented using a mix of hardware and/or software. The "signalling" between stages will, accordingly, be either a hardware signal on a connecting line (for example between two hardware stages), or alternatively the "signal" takes the form of a software call, or indication, (eg. between two software stages). This applies both to signals on the forward path 110, and on the reverse path 112 which relates to signalling of the stall conditions.

Stall signals flow in the reverse direction 112, and are depicted as dashed arrows in the figures, indicating that these signals are only generated in the present arrangement, if they are necessary to prevent buffer overflow. Other stall mechanisms are described in relation to FIG. 8. The forward data flow 110 is depicted by forward arrows having solid lines, indicating that this data is expected to flow in the normal course of printer operation. Stall condition signalling prevents data overflow from occurring in any processing stage, while at the same time allowing maximum concurrent processing to proceed.

The stall control mechanism, considered from the marking engine 408 end of the series of cascaded sub-processes in FIG. 4, operates as follows. The marking engine 408 accepts data synchronously from the output processing stage 404 on the line 406 as has been described. When the marking engine 408 is busy, it signals this "busy" state via a hardware signal depicted by a dashed arrow 410 to the output processing stage 404 which in turn stalls the colour converter process 400 via a hardware signal on a dashed arrow 412.

The colour converter 400 consequently stalls the rendering hardware sub-process 312 (see FIG. 3) by means of a signal on a dashed arrow 316. The rendering hardware 312, consequently stalls the renderer software interface 308, by means of a signal on a dashed arrow 318, this being performed if the display list memory 324 becomes full. This stall signal on the line 318 propagates further in the reverse direction to the interpreter sub-process 304 on a dashed arrow 320, blocking further write operations to the renderer 308. In turn, the interpreter 304 ceases reading input data from the receiving hardware interface 300, this being caused by a stall signal on a dashed arrow 322. The receiving hardware interface 300, in turn, stalls the host hardware interface 216 (see FIG. 2) by means of a signal on a dashed arrow 220, causing the host hardware interface 216 to block write calls from the port monitor 212 by means of a stall signal on the a dashed arrow 222. The port monitor 212, in turn, blocks write calls from the spooler 208 by means of a stall signal on a dashed arrow 224, this in turn being propagated to block write signals from the printer driver 204 by means of a stall signal on a dashed arrow 226. The printer driver 204, in turn, prevents the GDI calls from the host application 200 by means of a stall signal on a dashed arrow 228.

It should be noted that each of the aforementioned stall signals is asserted when a relevant downstream module cannot accept any further data, typically because an internal buffer associated with that downstream module is full. In this manner, for example, a stall signal generated by the marking engine 408 (see FIG. 4) can propagate all the way back to the host application 200 (see FIG. 2). It should, however, be noted that stall signals can originate anywhere along the series of pipelined sub-processes, and indeed can be generated at more than one location substantially simultaneously.

The printing system arrangement described in relation to FIGS. 2 to 4 operates in an end-to-end pipelined manner. Accordingly, the subprocesses 200, 204, 208, 212, 216, 300, 304, 308, 324, 313, 400, 404 and 408 are capable of concurrently processing job data from at least one page of the print job. This end-to-end concurrent processing on the forward path 110 (see FIG. 1), which is facilitated by the propagation of stall control signals on the reverse path 112, provides a significant advantage in the throughput of the described printing arrangement.

The disclosed method of data processing for printer systems can be implemented in dedicated hardware elements, or in dedicated software elements, or using a mix of hardware and software elements for the aforementioned process stages. Having regard to the particular implementation depicted in FIGS. 2 to 4, processing stages 200, 204, 208 and 212 are typically implemented in software. Accordingly, the interposed communication "connections", eg. 202 and 228, take the form of software calls, or indications. The interface processing stage 216 is typically implemented in a mixture of software and hardware. Accordingly, the connections 218 and 220 can take the form of a hardware/software mix, depending on the specifics of the interfaces used (eg. IEEE 1284 Ethernet, and so on). Processes 304 and 308 are typically implemented in software, while processes 324 and 312 are typically implemented in hardware. The connections between these various stages carry either hardware based signals, or software calls, in accordance with the specifics of the aforementioned implementation.

The method of data processing for a printing system may be implemented in dedicated hardware such as one or more integrated circuits performing the functions or sub functions of data processing for a printing system. Such dedicated hardware may include graphic processors, digital signal processors, or one or more microprocessors and associated memories.

Figure 5:
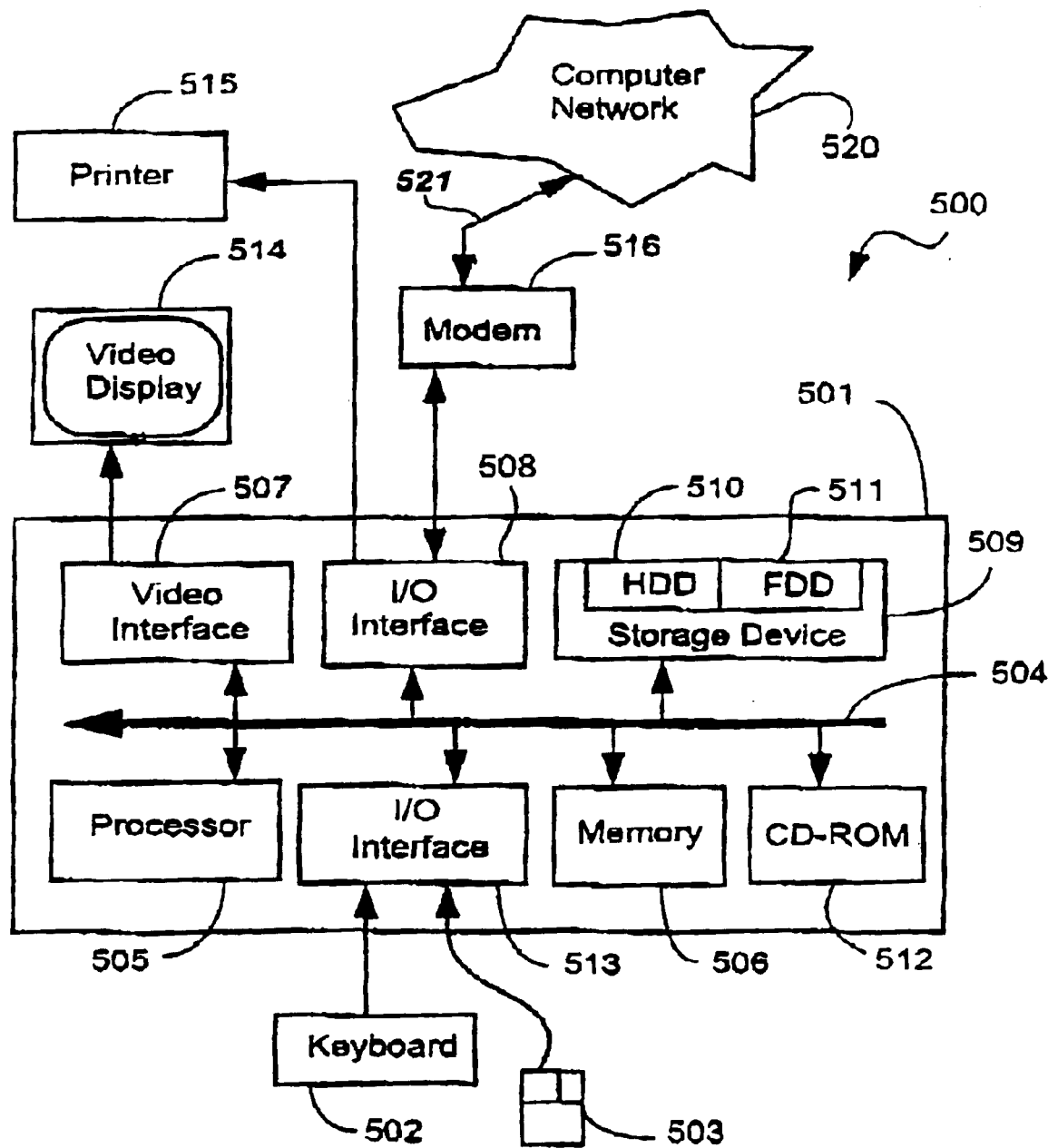
FIG. 5 is a schematic block diagram of a general purpose computer upon which the disclosed arrangement can be practised.
Figure 6:
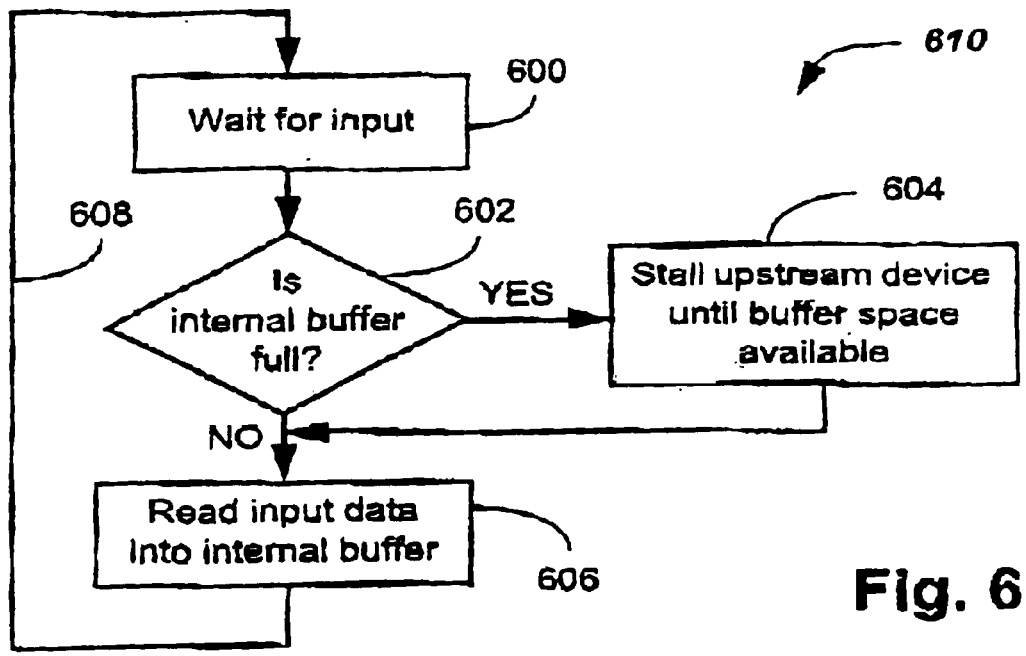
FIG. 6 is a flowchart of method steps relating to buffer-based processing of data from an upstream device.
Figure 7:
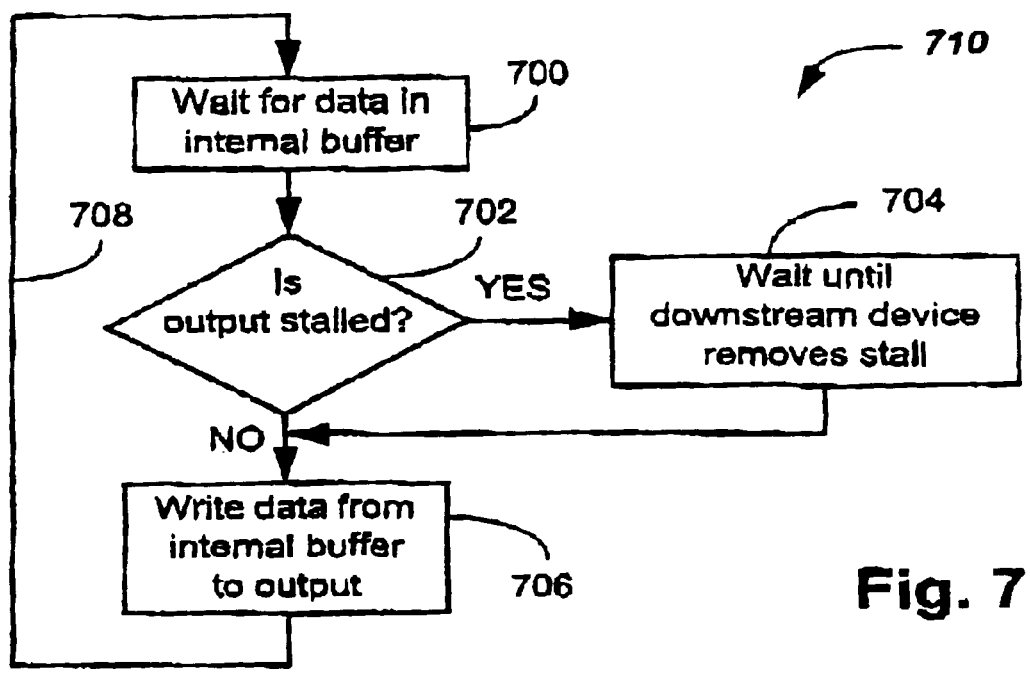
FIG. 7 is a flowchart of method steps relating to buffer-based processing of data for a downstream device.

The method of data processing for a printing system can also be practiced using convention general-purpose computer system 500, such as that shown in FIG. 5 wherein the processes of FIGS. 6 and 7 may be implemented as software, such as an application program executing within the computer system 500. In particular, the steps of data processing for a printing system are effected by instructions in the software that are carried out by the computer. The software may be divided into two separate parts, one part for carrying out the data processing for printing system methods, and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer effects an apparatus for data processing for a printing system in accordance with the described arrangements.

The computer system 500 comprises a computer module 501, input devices such as a keyboard 502 and mouse 503, output devices including a printer 515 and a display device 514. A Modulator-Demodulator (Modem) transceiver device 516 is used by the computer module 501 for communicating to and from a communications network 520, for example connectable via a telephone line 521 or other functional medium. The modem 516 can be used to obtain access to the Internet, and other network systems, such as a Local Area Network (LAN) or a Wide Area Network (WAN).

The computer module 501 typically includes at least one processor unit 505, a memory unit 506, for example formed from semiconductor random access memory (RAM) and read only memory (ROM), input/output (I/O) interfaces including a video interface 507, and an I/O interface 513 for the keyboard 502 and mouse 503 and optionally a joystick (not illustrated), and the interface 508 for the modem 516. A storage device 509 is provided and typically includes a hard disk drive 510 and a floppy disk drive 511. A magnetic tape drive (not illustrated) may also be used. A CD-ROM drive 512 is typically provided as a non-volatile source of data. The components 505 to 513 of the computer module 501, typically communicate via an interconnected bus 504 and in a manner which results in a conventional mode of operation of the computer system 500 known to those in the relevant art. Examples of computers on which the embodiments can be practised include IBM-PC's and compatibles, Sun Sparestations or alike computer systems evolved therefrom.

Typically, the application program of the embodiment is resident on the hard disk drive 510 and read and controlled in its execution by the processor 505. Intermediate storage of the program and any data fetched from the network 520 may be accomplished using the semiconductor memory 506, possibly in concert with the hard disk drive 510. In some instances, the application program may be supplied to the user encoded on a CD-ROM or floppy disk and read via the corresponding drive 512 or 511, or alternatively may be read by the user from the network 520 via the modem device 516. Still further, the software can also be loaded into the computer system 500 from other computer readable medium including magnetic tape, a ROM or integrated circuit, a magnetic-optical disk, a radio or infra-red transmission channel between the computer module 501 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

FIG. 6 shows a flowchart of method steps for a buffer-based port process 610 which "runs" on an upstream input port (such as the port 230, see FIG. 2) of a representative pipeline process (such as the printer driver 204 in this example) described in FIGS. 2 to 4. On a point of terminology, the "port process" 610 is to be differentiated from the "pipeline process" 204 (namely the printer driver 204) on whose upstream input port 230 the port process 610 runs. In a step 600, the port process 610 waits for input data from an upstream pipeline process. Thereafter, in a testing step 602, an internal buffer of the pipeline process 204 on whose upstream port the port process 610 is running is checked for overflow. If an overflow condition is detected, then the port process 610 is directed in accordance with a "yes" arrow to a stalling step 604, which stalls the upstream device (namely the host application 200) until buffer space in the pipeline process 204 becomes available. Once such space becomes available, the port process 610 is directed to a step 606 which proceeds to read input data from the upstream device into the internal buffer of the pipeline process 204. Returning to the testing step 602, if the internal buffer of the pipeline process 204 is not experiencing an overflow condition, then the port process 610 is directed in accordance with a "no" arrow to the step 606. After the step 606 reads input data from the upstream device into the internal buffer of the pipeline process 204, the port process 610 is directed accordance with an arrow 608 back to the step 600, where the port process 610 waits for further input data from the upstream process.

FIG. 7 shows a flowchart of method steps describing a buffer-based port process 710 which runs at the output (namely downstream facing) port (such as the port 232, see FIG. 2) of each pipeline process (such as the host hardware interface pipeline process 216) described in FIGS. 2 to 4. In a step 700, the port process 710 waits for data to appear in an internal buffer of the pipeline process 216. Once such data is detected, a testing step 702 considers whether the output of the pipeline process 216 is being stalled. If this is the case, then the port process 710 is directed in accordance with a "yes" arrow to a wait step 704, which freezes operation of the pipeline process 216 until the downstream device removes the present stall condition. Thereafter, the port process 710 is directed to a write step 706, which writes data from the internal buffer of the pipeline process 216 to the output post thereof. Returning to the testing step 702, if the output is not being stalled (ie, by the downstream device), then the process 710 is directed in accordance with a "no" arrow to the step 706. After step 706 the process 710 is directed in accordance with an arrow 708 back to the wait stop 700.

Figure 8:
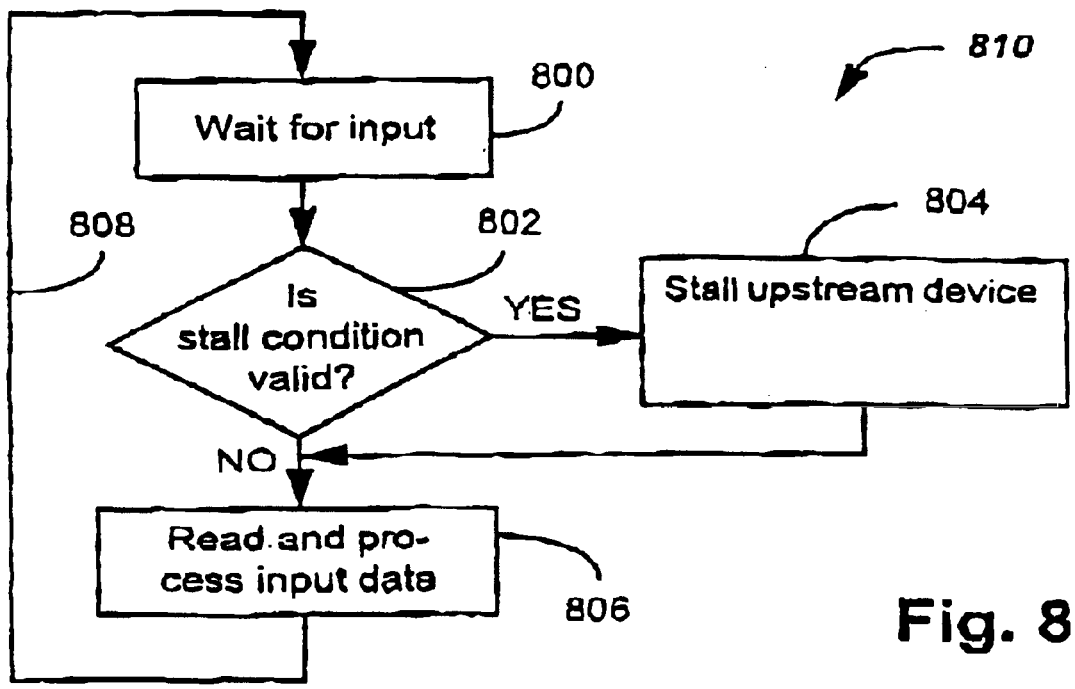
FIG. 8 is a flowchart of method step relating to generic stall-based processing of data from an upstream device.

FIG. 8 shows a flowchart of method steps for a generic stall-based port process 810 which "runs" on an upstream input port (such as the port 230 of FIG. 2) of a representative pipeline process (namely the printer driver 204) described in FIGS. 2 to 4. In a step 800, the port process 810 waits for input data from an upstream pipeline process. Thereafter, in a testing step 802, a test is performed for a "stall condition". Although FIGS. 6 and 7 depicted specific buffer-based stall processes, in fact a number of different mechanisms can lead to a general stall condition. Thus, for example, if a current process is too busy to read from an upstream process, then a stall condition will exist. In this case, the current process is too busy to either read new data from an upstream process, or to write processed output data to a corresponding downstream process. Alternately, a local buffer in the current process can be full, thereby leading to a stall condition, as described in relation to FIGS. 6 and 7. It is noted that in this case, the current process can write processed data out to a downstream process, however cannot read new input data from a corresponding upstream process. Alternately, a downstream process can itself be stalled, consequently propagating a stall condition back in the upstream direction to the current process. In this event, the current process is unable to write out to the stalled downstream process. Returning to FIG. 8, if a stall condition is detected, then the port process 810 is directed in accordance with a "yes" arrow to a stalling step 804, which stalls the upstream device (ie the host application 200) until the stall condition terminates. Once this occurs, the port process 810 is directed to a step 806 which proceeds to read and process input data from the upstream device. Returning to the testing step 802, if no stall condition exists, then the port process 810 is directed in accordance with a "no" arrow to the step 806. After the step 806 reads and processes input data from the upstream device, the port process 810 is directed in accordance with an arrow 808 back to the step 800, where the port process 810 waits for further input data from the upstream process.

Figure 9:
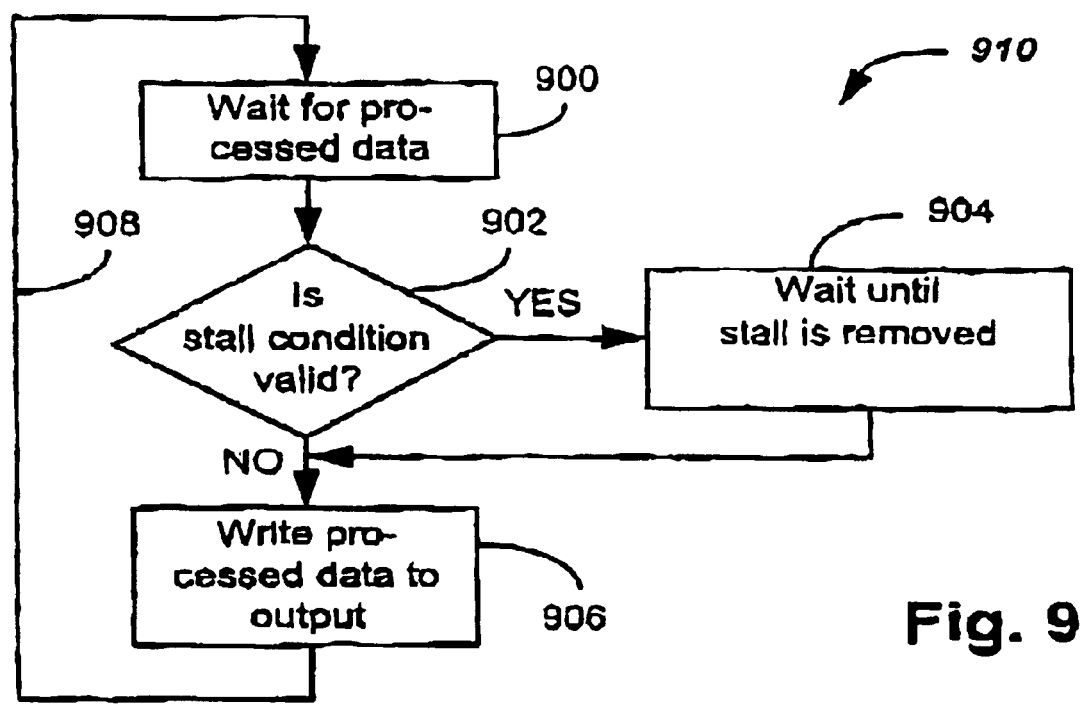
FIG. 9 is a flowchart of method steps relating to generic stall-based processing of date for a downstream device.

FIG. 9 shows a flowchart of method steps describing a generic stall-based port process 910 which runs at the output (ie. downstream facing) port (such as the port 232, see FIG. 2) of each pipeline process (eg the host hardware interface pipeline process 216) described in FIGS. 2 to 4. In a step 900, the port process 910 waits for processed data to be available as a result of processing by the current process. Once such data is detected, a testing step 902 considers whether a stall condition exists. If this is the case, then the port process 910 is directed in accordance with a "yes" arrow to a wait step 904, which freezes operation of the pipeline process 216 until the stall condition terminates. Thereafter, the port process 910 is directed to a write step 906, which writes processed data to the corresponding downstream process. Returning to the testing step 902, if no stall condition is present then the process 910 is directed in accordance with a "no" arrow to the step 906. After step 906 the process 910 is directed in accordance with an arrow 908 back to the wait step 900.

In general, each of the pipeline processes shown in FIGS. 2 to 4 (from the printer driver 204 to the output processing device 404) runs an associated input port process 810 and an associated output port process 910 on the corresponding input and output ports respectively of the pipelined process.

Industrial Applicability

It is apparent from the above that the embodiment(s) of the invention are applicable to the printing industry, and indeed to any industry in which high performance printing processes are used or required.

The foregoing describes only one embodiment of the present invention, and modifications and/or changes can be made thereto without departing from the scope and spirit of the invention, the embodiment being illustrative and not restrictive.

What is claimed is:

1. A printing system for printing a print job comprising a number of pages, the system including:

a renderer software interface;

a receiving hardware interface for performing first coupling of incoming page description data, in the form of a display list, to said renderer software interface, said renderer software interface being for performing first processing of the display list, thereby to output a first processed display list; and rendering hardware, adapted to perform second processing of the first processed display list, thereby to output raw pixel data, wherein said receiving hardware interface, said rendering software interface, and said renderer hardware are arranged to operate in a pipelined manner, being thereby capable of concurrently processing job data from at least one page of the print job.

2. A printing system according to claim 1, further comprising:

a host application for outputting at least one call defining said print job;

a printer driver for performing third processing of the at least one call, thereby to output page description data;

a host hardware interface for performing second coupling of the page description data to said receiving hardware interface;

an interpreter, interposed between said receiving hardware interface and said renderer software interface, wherein said receiving hardware interface couples said page description data to said interpreter, said interpreter receiving and processing the coupled page description data thereby to output the display list; and a marking engine for generating an image on an output print medium for the print job dependent upon the raw pixel data, wherein said host application, said printer driver, said host hardware interface, said interpreter and said marking engine are arranged to operate in a pipelined manner, being thereby capable of concurrently processing job data from at least one page of the print job.

3. A printing system according to claim 2, wherein the one call comprises a GDI call in a Windows™ operating system.

4. A printing system according to claim 2, further comprising a spooler and a port monitor interposed between said printer driver and said host hardware interface, and a colour converter and an output processor interposed between said rendering hardware and said marking engine, and wherein said spooler couples the page description data output from said printer driver to said port monitor, said port monitor couples the page description data output from said spooler to said host hardware interface, said colour converter converts the raw pixel data being represented in a first colour space to converted raw pixel data being represented in a second colour space, the converted raw pixel data being provided to said marking engine instead of the raw pixel data, and said spooler, said port monitor, and said colour converter are arranged to operate in a pipelined manner, being thereby capable of concurrently processing job data from at least one page of the print job.

5. A printing system according to claim 4, wherein at least one of said spooler and said port monitor is implemented in software.

6. A printing system according to claim 1, wherein said rendering hardware has a display list memory for storing the first processed display list.

7. A method of data processing for a printing system adapted for printing a print job comprising a number of pages, said method comprising steps of:

first coupling, by a receiving hardware interface, of incoming page description data to a renderer software interface in the form of a display list;

performing first processing, by the renderer software interface, of the display list, thereby to output a first processed display list; and performing second processing, by rendering hardware, of the first processed display list, thereby to output raw pixel data, wherein said first coupling, said first and said second processing steps are performed in a pipelined manner, being thereby capable of concurrently processing job data from at least one page of the print job.

8. A method according to claim 7, comprising further steps of:

outputting, by a host application, at least one call defining the print job;

performing third processing, by a printer driver, of the at least one call, thereby to output page description data;

second coupling, by a host hardware interface, the page description data to the receiving hardware interface;

interpreting, by an interpreter, the incoming page description data coupled from the receiving hardware interface, thereby to output the display list; and generating, by a marking engine, an image on an output print medium for the print job dependent upon the raw pixel data, wherein said outputting, third processing, second coupling, interpreting and generating steps are performed in a pipelined manner, being thereby capable of concurrently processing job data from at least one page of the print job.

9. A method according to claim 8, wherein the one call comprises a GDI call in a Windows™ operating system.

10. A method according to claim 8, comprising further steps of:

third coupling, by a spooler, the page description data output from the printer driver to a port monitor;

fourth coupling, by the port monitor, the page description data output from the spooler to the host hardware interface;

storing, by a display list memory, the first processed display list for outputting to the rendering hardware;

converting, by a colour converter, the raw pixel data being represented in a first colour space to converted raw pixel data being represented in a second colour space, the converted raw pixel data being provided to the marking engine instead of the raw pixel data, wherein said third and fourth coupling steps, said storing and said converting steps are performed in a pipelined manner, being thereby capable of concurrently processing job data from at least one page of the print job.

11. A method according to claim 10, wherein at least one of the spooler and the port monitor is implemented in software.

12. A computer readable medium storing a program for a print system adapted to print a job comprising a number of pages, said program comprising:

code for a first coupling step of coupling, by a receiving hardware interface, of incoming page description data to a renderer software interface in the form of a display list;

code for a first processing step of processing, by the renderer software interface, of the display list, thereby to output a first processed display list; and code for a second processing step of processing, by rendering hardware, of the first processed display list, thereby to output raw pixel data, wherein said code for the first coupling step and said code for the first and said second processing steps operate in a pipelined manner, being thereby capable of concurrently processing job data from at least one page of the print job.

13. A computer program for a print system adapted to print a job comprising a number of pages, said program comprising:

code for a first coupling step of coupling, by a receiving hardware interface, of incoming page description data to a renderer software interface in the form of a display list;

code for a first processing step of processing, by the renderer software interface, of the display list, thereby to output a first processed display list; and code for a second processing step of processing, by rendering hardware, of the first processed display list, thereby to output raw pixel data, wherein said code for the first coupling step and said code for the first and said second processing steps operate in a pipelined manner, being thereby capable of concurrently processing job data from at least one page of the print job.

14. A method of data processing for a printing system according to claim 1, which comprises a sequence of pipeline processes, said method comprising, for a current pipeline process being said renderer software interface, steps of:

reading input data from an upstream pipeline process being the receiving hardware interface;

operating upon the input data if an internal buffer of the current pipeline process is not full;

stalling the upstream pipeline process, if the internal buffer is full; and writing the input data, having operated thereupon, to a downstream pipeline process being the rendering hardware, if the downstream pipeline process is not stalling the current pipeline process.

15. method according to claim 14, wherein said operating step comprises at least one of;

processing the input data; and storing the input data

16. A method according to claim 14, wherein the sequence of pipeline processes comprises at least one hardware process and one software process.

17. A method according to claim 14, wherein said operating step associated with each process in the sequence of pipeline processes is performed substantially concurrently, by all processes in the sequence.

* * * * *

UNITED STATES PATENT AND TRADEMARK OFFICE
CERTIFICATE OF CORRECTION

PATENT NO. : 6,954,803 B2
DATED : October 11, 2005
INVENTOR(S) : Stoney

It is certified that error appears in the above-identified patent and that said Letters Patent is hereby corrected as shown below:

Column 3,
Line 6, "of;" should read -- of: --; and
Line 41, "date" should read -- data --.

Column 6,
Line 30, delete "the" (first occurrence).

Column 7,
Line 20, "convention" should read -- conventional --;
Lines 66 and 67, "Sun Spar-estations" should read -- Sun Sparc-stations --.

Column 8,
Line 49, "directed" should read -- directed in --.

Column 9,
Line 1, "(ie," should read -- (i.e., --;
Line 22, "however" should read -- however, it --;
Line 30, "(ie" should read -- (i.e., --;
Line 43, "(ie." should read -- (i.e., --; and
Line 44, "(eg" should read -- (e.g., --.

Signed and Sealed this

Twenty-third Day of May, 2006

JON W. DUDAS
*Director of the United States Patent and Trademark Office*